United States Patent
Xu et al.

(10) Patent No.: US 11,382,030 B2
(45) Date of Patent: Jul. 5, 2022

(54) ENTERPRISE-BASED NETWORK SELECTION

(71) Applicant: Hewlett Packard Enterprise Development LP, Houston, TX (US)

(72) Inventors: Lina Xu, Beijing (CN); Jun Qing Xie, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 863 days.

(21) Appl. No.: 16/071,261

(22) PCT Filed: Jan. 29, 2016

(86) PCT No.: PCT/CN2016/072658
§ 371 (c)(1),
(2) Date: Jul. 19, 2018

(87) PCT Pub. No.: WO2017/128270
PCT Pub. Date: Aug. 3, 2017

(65) Prior Publication Data
US 2021/0204205 A1 Jul. 1, 2021

(51) Int. Cl.
*H04W 4/00* (2018.01)
*H04W 48/18* (2009.01)
(Continued)

(52) U.S. Cl.
CPC ........... *H04W 48/18* (2013.01); *H04W 36/08* (2013.01); *H04W 36/22* (2013.01); *H04W 48/06* (2013.01); *H04W 84/105* (2013.01)

(58) Field of Classification Search
CPC combination set(s) only.
See application file for complete search history.

(56) References Cited

U.S. PATENT DOCUMENTS

| 8,976,663 B2 | 3/2015 | Qiang |
| 2009/0077620 A1 | 3/2009 | Ravi et al. |

(Continued)

FOREIGN PATENT DOCUMENTS

| CN | 101207900 A | 6/2008 |
| CN | 102271386 A | 12/2011 |

(Continued)

OTHER PUBLICATIONS

International Search Report and Written Opinion, International Application No. PCT/CN2016/072658, dated Jan. 29, 2016, pp. 1-11.

(Continued)

*Primary Examiner* — Justin Y Lee
(74) *Attorney, Agent, or Firm* — Hewlett Packard Enterprise Patent Department (57) ABSTRACT

In some examples, a user equipment may perform a method that includes identifying that a first wireless network operated by an enterprise is accessible to the user equipment as well as identifying that a second wireless network different from the first wireless network and also operated by the enterprise is accessible to the user equipment. The method performed by the user equipment may further include selecting the first wireless network to connect to instead of the second wireless network based on an enterprise employee characteristic associated with the user equipment.

14 Claims, 8 Drawing Sheets

(51) Int. Cl.
*H04W 36/08* (2009.01)
*H04W 36/22* (2009.01)
*H04W 48/06* (2009.01)
*H04W 84/10* (2009.01)

(56) References Cited

U.S. PATENT DOCUMENTS

| | | | | |
|---|---|---|---|---|
| 2010/0178919 A1* | 7/2010 | Deepak | ............... | H04W 48/16 455/435.2 |
| 2010/0323698 A1* | 12/2010 | Rune | ............... | H04W 48/06 455/436 |
| 2012/0030353 A1 | 2/2012 | Balogh | | |
| 2012/0084184 A1 | 4/2012 | Raleigh et al. | | |
| 2014/0029420 A1 | 1/2014 | Jeong et al. | | |
| 2014/0233386 A1 | 8/2014 | Jamadagni et al. | | |
| 2015/0058938 A1 | 2/2015 | Gaspar | | |
| 2015/0156079 A1 | 6/2015 | Satterlee et al. | | |
| 2015/0195759 A1 | 7/2015 | Sirotkin et al. | | |
| 2015/0195779 A1* | 7/2015 | Wu | ............... | H04W 48/16 370/338 |
| 2015/0208335 A1 | 7/2015 | Vrbaski et al. | | |
| 2017/0078936 A1* | 3/2017 | Bergstrom | ............... | H04W 36/26 |

FOREIGN PATENT DOCUMENTS

| | | |
|---|---|---|
| CN | 103188761 A | 7/2013 |
| CN | 104468552 A | 3/2015 |
| CN | 104838696 A | 8/2015 |
| WO | 2013/192108 A2 | 12/2013 |
| WO | 2015/003323 A1 | 1/2015 |
| WO | WO-2015007316 A1 | 1/2015 |

OTHER PUBLICATIONS

Mahindra et al., A practical traffic management system for integrated LTE-WiFi networks, Proceedings of the 20th annual international conference on Mobile computing and networking, MobiCom '14, 2014, pp. 189-200.
GoS Networks, "Wi-Fi Offload and Distributed ANDSF", available online at <https://web.archive.org/web/20171009183943/http://www.gosnetworks.com/solutions/wifi-offload-and-distributed-andsf>, Oct. 2017, 4 pages.
European Search Report and Search Opinion Received for EP Application No. 16887157.2, dated Mar. 27, 2019, 15 pages.
3rd Generation Partnership Project, "Technical Specification Group Services and System Aspects; 3GPP system to Wireless Local Area Network (WLAN) interworking; System description", Release 13, 3GPP TS 23.234, V13.1.0, 2017, 16 pages.
3rd Generation Partnership Project, "Technical Specification Group Core Network and Terminals; Access Network Discovery and Selection Function (ANDSF) Management Object (MO)", Release 15, 3GPP TS 24.312, V15.0.0, Jun. 2018, 394 pages.
"Smith Micro Software: NetWise", available online at <https://web.archive.org/web/20171121184819/http://www.smithmicro.com/operator/products/netwise-smartspot/features-benefits>, Nov. 2017, 2 pages.
"Smart Access Manager™ (SAM)"InterDigital Inc., available online at <https://web.archive.org/web/20160923205837/https://www.interdigital.com/solution/smart-access-manager>, Sep. 2016, 4 pages.
"Qualcomm Snapdragon", Qualcomm Incorporated, available online at <www.qualcomm.com/snapdragon>, 2011, 2 pages.
"OpenEPC", available online at <https://web.archive.org/web/20170925015825/http://openepc.com/>, 2017, 3 pages.
International Search Report and Written Opinion received for PCT Application No. PCT/CN2016/072658, dated Sep. 30, 2016, 7 pages.
Qualcomm, "A 3G/LTE Wi-Fi Offload Framework: Connectivity Engine (CnE) to Manage Inter-System Radio Connections and Applications," Jun. 2011, 15 pages, https://www.google.co.in/url?sa=t&rct=j&q=&esrc=s&source=web&cd=1&cad=rja&uact=8&ved=0CCEQFjAAahUKEwjBwriG7frGAhVScl4KHeRSC9g&url=https%3A%2F%2Fwww.qualcomm.com%2Fmedia%2Fdocuments%2.

* cited by examiner

ENTERPRISE-BASED NETWORK SELECTION

BACKGROUND

High speed communication networks form part of the backbone of what has become indispensable worldwide data connectivity. Within such communication networks, various network devices including endpoint devices and switching devices direct network traffic from source ports to destination ports, helping to eventually guide a data packet from a source to a destination.

BRIEF DESCRIPTION OF THE DRAWINGS

Certain examples are described in the following detailed description and in reference to the drawings.

DETAILED DESCRIPTION

Certain implementations of the present disclosure are directed to systems, methods, devices, logic, etc. that can, for example, provide enterprise-based network selection. An enterprise may refer to a logical or physical organization that acts as single entity. Example enterprises include businesses, corporations, non-profit organizations, commercial establishments, academic institutions, government entities, and more. As described in greater detail below, enterprise-based network selection features may, in accordance with certain implementations of the present disclosure, be used to flexibly balance network parameters in an enterprise environment according to various parameters or goals, such as network throughput, security, quality of service, prioritized applications, network costs, etc., and balance such parameters based on configurable factors specific to an enterprise. As such, features of certain implementations described herein may increase the flexibility, efficiency, and quality of network connections for enterprise devices and user equipments.

Figure 1:
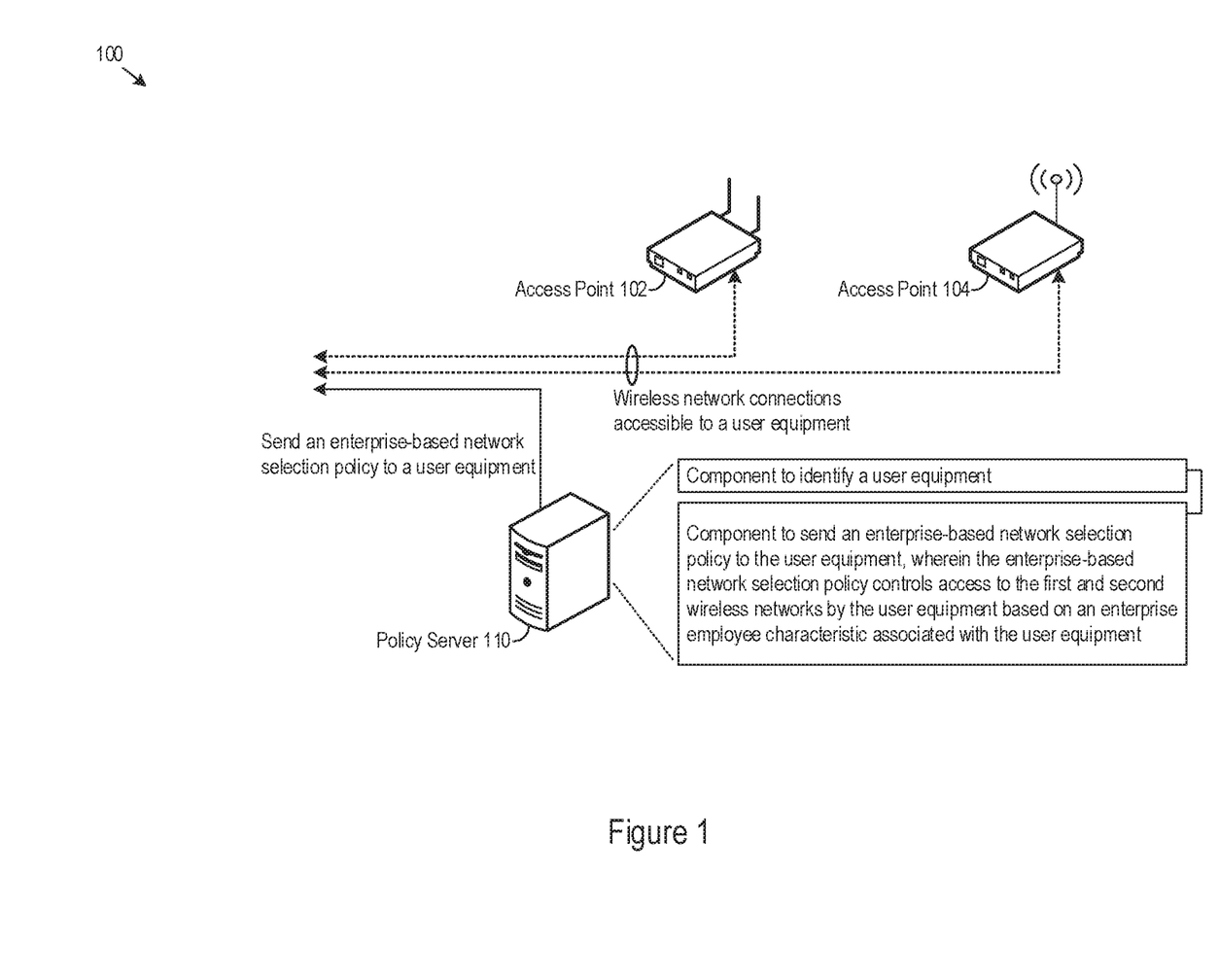
FIG. 1 shows an example of a system that supports enterprise-based network selection.

FIG. 1 shows an example of a system 100 that supports enterprise-based network selection. The system 100 may be implemented or located within an enterprise, such as within an enterprise building or enterprise campus. The system 100 includes multiple access points (APs), including the access points 102 and 104 shown in FIG. 1. The access points 102 and 104 may provide network access to different wireless networks. In that regard, the access point 102 may provide network access to a first wireless network operated by the enterprise (or another operator, such as a cellular provider). The access point 104 may provide network access to a second wireless network also operated by the enterprise (or another operator).

The first and second wireless networks accessible within an enterprise environment may utilize different communication technology. In that regard, the first and second wireless networks may operate according to different wireless network protocols, techniques, or standards. Various wired or wireless communication networks offer different network capabilities, security mechanisms, bandwidth, throughput, quality-of-service, or otherwise differ in various other attributes. As a continuing example used herein, the first and second wireless networks may be a Wi-Fi network (e.g., operating according to the 802.11 communication standard) and a cellular network operating according to the Long-Term Evolution (LTE) communication standard. In this continuing example, the Wi-Fi network may provide cost-efficient network access and the LTE network may provide increased throughput and quality of service, but a greater cost. Wi-Fi and LTE are two example communication networks however, and the enterprise-based network selection features described herein may be consistently applied across wired or wireless communication networks of any type (including multiple communication networks of the same type).

The system 100 shown in FIG. 1 includes a policy server 110. The policy server 110 may be implemented as a single or multiple computing devices. As described in greater detail below, the policy server 110 may support enterprise-based network selection in an enterprise environment by maintaining and propagating enterprise-based network selection policies to devices within the enterprise environment, including user equipments, access points, or any other network devices within the enterprise environment. The policy server 110 may maintain such policies by storing, generating, updating, altering, replacing, or otherwise managing the enterprise-based network selection policies for an enterprise.

The selection policies maintained by the policy server 110 may control network access by user equipments within an enterprise environment according to enterprise-specific factors, such as an enterprise employee characteristics associated with a user equipment, an enterprise department, employee identification values and priority levels, enterprise-preferred application traffic, enterprise-specific locations (e.g., meeting rooms, department offices, etc.), or any other factor specific to an enterprise. Thus, the enterprise-based network selection policies may flexibly control network access by user equipments according various enterprise-specific factors or conditions with varying degrees of granularity and detail, allowing an enterprise to adapt network access to meet the specific goals and parameters determined by the enterprise.

Various components of the policy server 110 may support the enterprise-based network selection functionality of the policy server 110. The policy server 110 may implement such components in various ways, for example as hardware and programming. The programming of the policy server 110 may take the form of processor-executable instructions stored on a non-transitory machine-readable storage medium. The hardware of the policy server 110 may include a processing resource to execute those instructions. A processing resource may take the form of single processor or multi-processor systems, and in some examples, the policy server 110 implements multiple components using common hardware (e.g., a common processing resource).

As one example, the policy server 110 shown in FIG. 1 includes a component to identify that a user equipment is within a coverage area of both the first wireless network and the second wireless network operated by the enterprise as well as a component to send an enterprise-based network selection policy to the user equipment, wherein the enterprise-based network selection policy controls access to the first and second wireless networks by the user equipment based on an enterprise employee characteristic associated with the user equipment.

Example enterprise-based network selection features are described in greater detail next.

Figure 2:
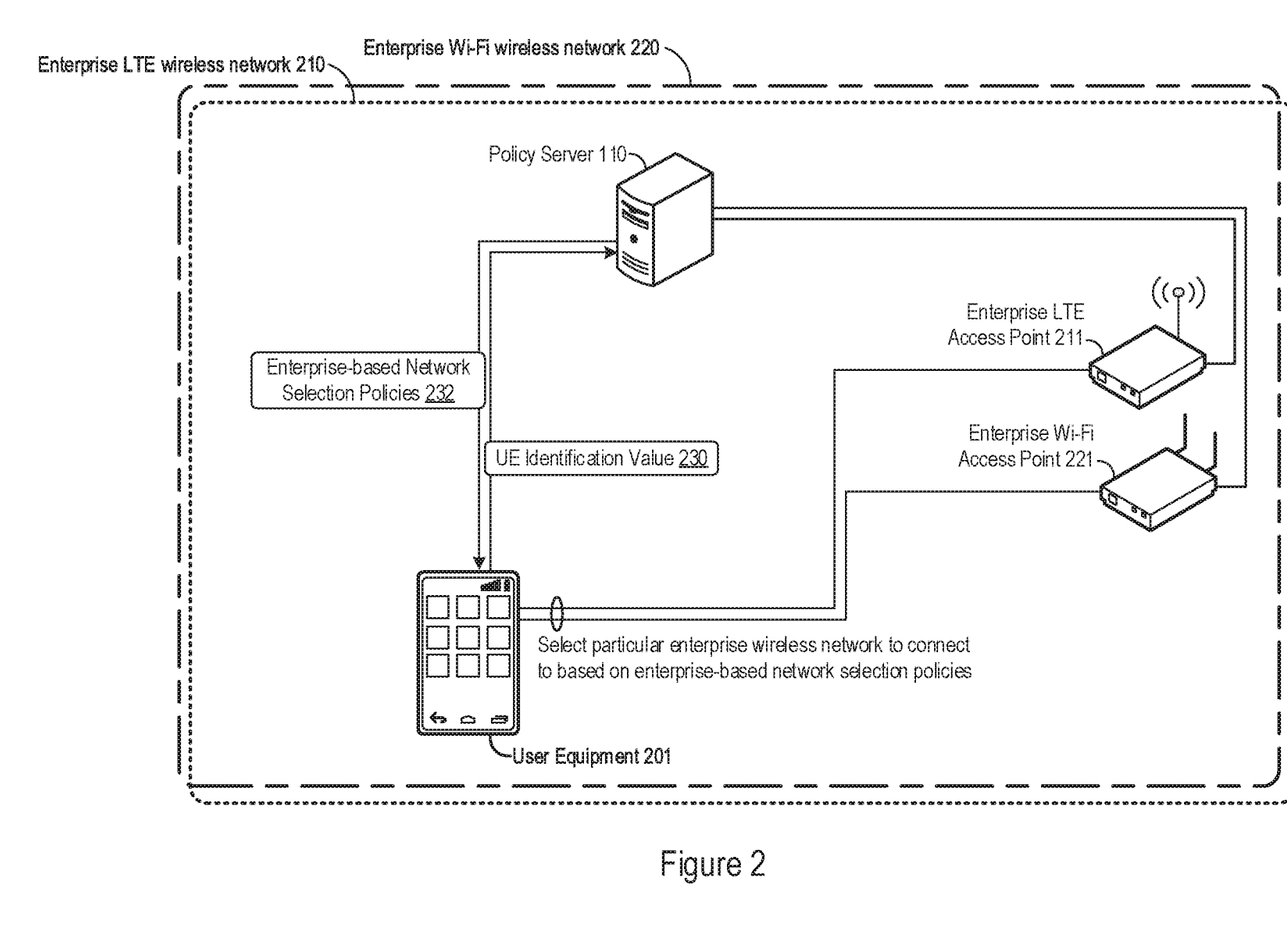
FIG. 2 shows an example of an enterprise-based network selection that a user equipment may perform.

FIG. 2 shows an example of an enterprise-based network selection that a user equipment may perform. A user equipment may refer to any device that can be operated by a user to communicate data across a communication network. FIG. 2 shows a user equipment 201 in the form of a mobile phone. Other examples of user equipments include desktop or laptop computers, tablet devices, portable e-mail or music devices, wearable electronic devices (such as a smartwatch, headsets, optical head-mounted displays), and the like.

The user equipment 201 may determine that various communication networks are available for communicating network data, for example when within range of access points of the various communication networks. In FIG. 2, the user equipment 201 may determine that an enterprise LTE wireless network 210 is available to connect to, e.g., by receiving a beacon message from the enterprise LTE access point 211 (which may take the form of a femtocell, for example). Along similar lines, the user equipment 201 may determine that an enterprise Wi-Fi wireless network 220 is available to connect to through the enterprise Wi-Fi access point 221.

A policy server 110 may control which enterprise communication network that the user equipment 201 connects to. In FIG. 2, the policy server 110 may control access to the enterprise LTE wireless network 210 and/or the enterprise Wi-Fi wireless network 220 by the user equipment 201 through enterprise-based network selection policies. To identify user equipment 201, the user equipment 201 may provide a user equipment (UE) identification value 230 to the policy server 110. The UE identification value 230 may be any value that identifies the user equipment 201 (or component thereof), such as an international mobile station equipment identity (IMEI) value for cellular phones, a device ID value for a wireless network adapter of the user equipment 201 (e.g., an LTE antenna or modem connected to a laptop computer), or any other identification value specific to the user equipment 201 or a component thereof. The policy server 110 may use the UE identification value 230 to identify various enterprise-specific characteristics associated with the user equipment 201, such as an employee associated with the user equipment 201 and various enterprise employee characteristics of the employee (some of which are described in greater detail below with respect to FIG. 3).

The policy server 110 may receive the UE identification value 230 from the user equipment 201 in various ways. In some examples, the user equipment 201 communicates the UE identification value 230 as part of an initial communications with the access points 211 or 221 to identify the availability of the enterprise LTE wireless network 210 and enterprise Wi-Fi wireless network 220 respectively. The access points 211 or 221 may then communicate the UE identification value 230 of the user equipment 201 to the policy server 110. As another example, the policy server 110 may support out-of-band communications with the user equipment 201 to retrieve the UE identification value 230 and transmit enterprise-based network selection policies 232 to the user equipment 201.

The enterprise-based network selection policies 232 maintained by the policy server 110 may provide various enterprise-specific criteria that control the particular communication network(s) that the user equipment 201 connects to. As such, the user equipment 201 may select a particular wireless network to connect to in accordance with the enterprise-based network selection policies 232 received from the policy server 110.

The enterprise-specific criteria specified by the enterprise-based network selection policies 232 may allow an enterprise (e.g., an enterprise network administrator or other entity within the enterprise) to control network access according to enterprise-specific factors. That is, through the enterprise-based network selection policies 232, the policy server 110 may control network access on a per-enterprise employee, per-department, per-campus, per-office, or per-enterprise application basis, as some examples. Through the UE identification value 230, the policy server 110 may associate certain enterprise characteristics with the user equipment 201, such as by identifying an employee that uses the user equipment 201 as well as various other enterprise employee characteristics attributable to the user equipment 201. Some of these characteristics are described in next with regards to FIG. 3.

Figure 3:
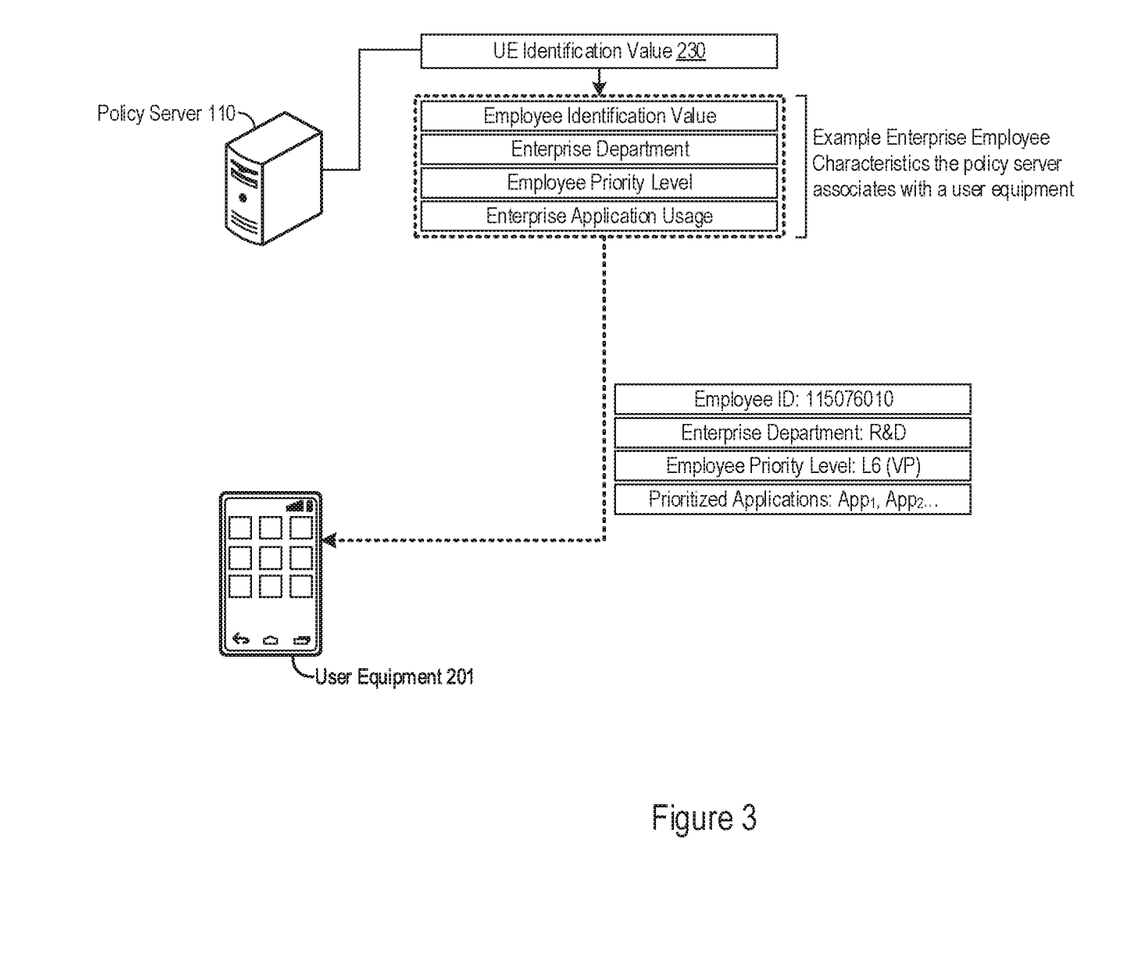
FIG. 3 shows example enterprise employee characteristics that a policy server may associate with a user equipment.

FIG. 3 shows example enterprise employee characteristics that the policy server 110 may associate with a user equipment 201. In particular, the policy server 110 may use an UE identification value 230 of the user equipment 201 to associate enterprise employee characteristics with the user equipment 201. As shown in FIG. 3, example enterprise employee characteristics that the policy server 110 may attribute to the user equipment 201 include an employee identification value, an enterprise department, an employee priority level, and an enterprise application usage characteristic.

In some examples, the policy server 110 may maintain or otherwise access an enterprise employee characteristic database that maps the UE identification value 230 of the user equipment 201 to the specific enterprise employee characteristics associated with the user equipment. In the example shown in FIG. 2, the enterprise employee characteristics include an employee ID value of "115076010", an enterprise department value of "R&D", an employee priority level of "L6 (VP)", and prioritized applications listed as "App$_1$, App$_2$, . . . ". Additionally or alternatively, the user equipment 201 may itself locally store or otherwise access the enterprise employee characteristics, allowing the user equipment 201 to evaluate the criteria specified by the enterprise-based network selection policies 232 and connect to a particular enterprise communication network accordingly.

The various enterprise employee characteristics accessible to the policy server 110 or user equipment 201 may support enterprise-based network selection policies 232 that control access to enterprise communication networks according to varying granularities within an enterprise. For instance, the policy server 110 may maintain and send a unique set of enterprise-based network selection policies on a per-employee basis according to the employee ID value. That is, for a user equipment associated with a first employee ID value may receive a first set of enterprise-based network selection policies that differs from a second set of enterprise-based network selection policies received by another user equipment associated a different employee ID value.

In this example, the user equipment associated with the first employee ID value may, through the first set of enterprise-based network selection policies, access the enterprise LTE wireless network 210 (which may provide increased network throughput and quality-of-service as compared to the enterprise Wi-Fi wireless network 220) for longer time intervals (e.g., during normal business hours) than the other user equipment (e.g., for the first half of normal business hours or during normal business hours but only when the consumed bandwidth of the enterprise LTE wireless network 210 is below a specified usage threshold). Thus, the policy server 110 may tailor access to enterprise communication networks on an employee-specific basis.

In a similar way, the policy server 110 may control access to enterprise communication networks based on enterprise departments or employee priority level. An enterprise department may refer to a particular division within the enterprise, e.g., that deals with a specific enterprise aspect or area of activity. An employee priority level may refer to a value attributed to an enterprise employee according to a ranking system, e.g., job seniority, a personnel structure, etc. Thus, an enterprise may include multiple departments such as research & development, legal, sales, operations, human resources, finances, and more and each department may include employees with differing priority levels, such as individual contributor, management, senior management, vice presidents, or according to any other personnel structure specified by the enterprise. Also, employee priority levels may be applied across multiple enterprise departments (e.g., multiple departments may include L6 (VP) level employees), and thus the policy server 110 may control network access according to various different enterprise granularities.

To illustrate, the policy server 110 may control access to enterprise communication networks based on an employee priority level associated with the user equipment 201. When the policy server 110 itself accesses the enterprise employee characteristics, the policy server 110 may send varying sets of enterprise-based network selection policies based on enterprise department or employee priority level, which the policy server 110 may identify for a specific user equipment based on the UE identification value of the user equipment. As another example, the policy server 110 may maintain an enterprise-based network selection policy that specifies connecting to a first wireless network (e.g., Wi-Fi) when the employee priority level does not exceed a high priority threshold and connecting to a second wireless network (e.g., LTE) when the employee priority level exceeds the high priority threshold. A user equipment receiving such an enterprise-based network selection policy may itself determine the associated employee priority level for the user equipment, and connect to the first or second wireless network according to the enterprise-based network selection policy.

Along similar lines, the policy server 110 may maintain enterprise-based network selection policies that control network access based on the particular enterprise department associated with a user equipment. For instance, the enterprise-based network selection policies 232 sent to the user equipment 201 may include a particular policy that specifies connecting to the first wireless network when the enterprise department is a first enterprise department and connecting to the second wireless network when the enterprise department is a second enterprise department.

In that regard, particular enterprise departments may be granted access to higher-throughput networks or networks with increased quality of service and reliability, whereas other enterprise departments may be granted access to cost-efficient networks. An example delineation between enterprise departments may be client and non-client facing departments, which may distinguish between those enterprise departments, employees, or divisions that interact directly (or indirectly) with clients or other external entities and those that do not. Thus, for a user equipment associated with a client-facing enterprise department (e.g., a sales department), the policy server 110 may maintain or propagate an enterprise-based network selection policy that grants access to an enterprise communication network that supports a threshold quality of service, such as the enterprise LTE wireless network 210. For a user equipment associated with a non-client-facing department (e.g., a research and development department), the enterprise-based network selection policy may grant access to a lower-cost network with a lesser quality of service, such as the enterprise Wi-Fi wireless network 220.

As another example, the enterprise employee characteristics may include specific enterprise applications associated with a user equipment through which the policy server 110 may control access to enterprise communication networks. An enterprise application may refer to a specific application that is supported, installed, approved, or otherwise selected by an enterprise for enterprise-specific use. An enterprise itself may flexibly configure or specify which applications are supported and used by the enterprise, prioritizing the network traffic from these enterprise applications in routing data across enterprise communication networks.

The policy server 110 may thus maintain enterprise-based network selection policies that are application-aware. Put another way, enterprise-based network selection policies sent to a user equipment may support differentiate network access according the particular application of the user equipment that is communicating data across the enterprise communication networks. An enterprise-based network selection policy may specify that network traffic generated by a particular enterprise application (e.g., e-mail, communicator, or company file access applications) be communicated through a first network whereas network traffic generated by non-enterprise applications (e.g., web browser or media streaming applications) be communicated through a second network or be blocked altogether.

The enterprise-based network selection policies maintained by the policy server 110 may further differentiate between various enterprise applications according to any characteristic of network traffic generated by the enterprise applications. As one example, an enterprise-based network selection policy may differentiate based on traffic latency by specifying that enterprise applications that generate more than a threshold amount of network traffic (e.g., as a whole, over a predetermined period of time, at a particular rate, etc.) communicate the network traffic across a first network while enterprise applications that do not generate more than the threshold amount of network traffic communicate the network traffic across a second network.

While some example enterprise employee characteristics are presented above and herein, the policy server 110 may maintain enterprise-based network selection policies that control access to enterprise communication networks according to any aspect, factor, or criteria relevant to an enterprise. The policy server 110 may further specify enterprise-based network selection policies that account for enterprise-specific factors in combination with other factors, such as real-time network conditions (that the policy server 110 may monitor), network usage costs, user equipment capabilities and power availability, and more.

As one particular example, an enterprise-based network selection policy may control access based on backhaul conditions of an enterprise communication network. In particular, the enterprise-based network selection policy may control access to a first and second enterprise wireless network by a user equipment based on a backhaul condition of the first wireless network, the second wireless network, or both. As the enterprise itself may maintain or operate various enterprise communication networks, the policy server 110 may access backhaul conditions of the networks, such as the enterprise LTE wireless network 210. When the backhaul condition of an enterprise network cannot support the quality of service or other network parameters for the enterprise, the enterprise-based network selection policies may specify that a user equipment connect instead to a different enterprise communication network.

While the backhaul condition of a wireless network provides but one example, the enterprise-based network selection policies maintained by the policy server 110 may control access based on the network condition along any portion of the communication path between a user equipment and another end device. Thus, enterprise-based network selection policies may account for the load or congestion of particular enterprise network access points, network load on external communication networks, backhaul conditions (as noted above), or combinations thereof.

In some examples, the policy server 110 implements the enterprise-based network selection policies in accordance with a format specified by a communication standard. Doing so may support allow the policy server 110 to effectuate the enterprise-based network policies according to a format already supported by user equipment. As a particular example, the policy server 110 may maintain the enterprise-based network selection policies in format supported by the Access Network Discovery and Selection Function (ANDSF) of the 3$^{rd}$ Generation Partnership Project (3GPP) standard. In this example, the enterprise-based network selection policies may take the form of nodes in the Inter-System Routing Policy (ISRP) and/or WLAN Selection Policy (WLANSP) elements of ANDSF policies.

In a format supported by ANDSF, the enterprise-based network policies may be specified in an eXtensible Markup Language (XML) format. For instance, the following example segment of an XML file may identify a videoconferencing application as an enterprise application:

```
<Node>
    <NodeName>EnterpriseApps</NodeName>
    <Node>
        <NodeName>App_ID</NodeName>
        <Node>
            <NodeName>Android</NodeName>
            <Node>
                <NodeName>OSApps</NodeName>
                <Node>
                    <NodeName>VideoConference</NodeName>
                    <Node>
                        <NodeName>OSAPPID</NodeName>
                        <MIME>VideoPackgName</MIME>
                    </Node>
                </Node>
            </Node>
        </Node>
    </Node>
</Node>
```

In the example above, only the node name tag is shown for brevity, though other node elements may be present as well.

As described above, the policy server 110 may maintain enterprise-based network selection policies that control access to enterprise communication networks by a user equipment based on enterprise-specific factors, other factors, or a combination of both. To provide a concrete illustration, the policy server 110 may maintain the following set of enterprise-based network policies controlling access to enterprise LTE and Wi-Fi networks, shown in table 1 below:

TABLE 1

Example set of Enterprise-Based Network Selection Policies

| Policy ID | Policy Details | Priority |
|---|---|---|
| IFOM_1 | All traffic flows choose Wi-Fi over LTE | 20 |
| IFOM_2 | Traffic from enterprise applications is routed through LTE | 19 |
| IFOM_3 | Traffic from an enterprise application is routed through Wi-Fi when the LTE network usage exceeds a high usage threshold | 18 |
| IFOM_4 | Traffic from a high priority employee is routed through LTE | 17 |
| IFOM_5 | When the Wi-Fi AP resource usage exceeds a high usage threshold and LTE does not (WLAN channel utilized rate > MAXLEVEL and LTE channel utilized rate < MAXLEVEL), LTE is selected over Wi-Fi | 16 |

In the example above, the enterprise-based network policies may include multiple connection criteria at varying priorities, which may indicate an order by which the user equipment evaluates the details or criteria of the policies. In some examples, the policy server 110 may activate or deactivate any of the policy nodes to further control which specific portions of the enterprise-based network selection policies to apply at a particular time.

The enterprise-based network selection policies maintained by the policy server 110 and applied by a user equipment may allow an enterprise to flexibly configure network access by user equipments at enterprise-specific granularities (e.g., per employee, department, application, etc.). Thus, an enterprise may configure network access for different portions of the enterprise to meet the specific quality of service, throughput, cost, or other network parameters and settings relevant to the enterprise. These enterprise-specific configurations may result in reduced network costs, increased network throughput and balancing of resources, prioritized communication of preferred application traffic, increased network configurability by the enterprise, and more.

The policy server 110 may flexibly adapt to changing network condition or enterprise-specific events by updating the enterprise-based network selection policies. Such updates may allow the policy server 110 to alter the network selection policies in real-time, thus adapting the network connections of user equipments to account for a changing network condition, occurrence of enterprise-specific events, or any other trigger. One example of an enterprise-specific event is a meeting (e.g., a business meeting at a particular conference room within the enterprise) and example enterprise-based network selections based this example enterprise-specific event are described in greater detail next.

Figure 4:
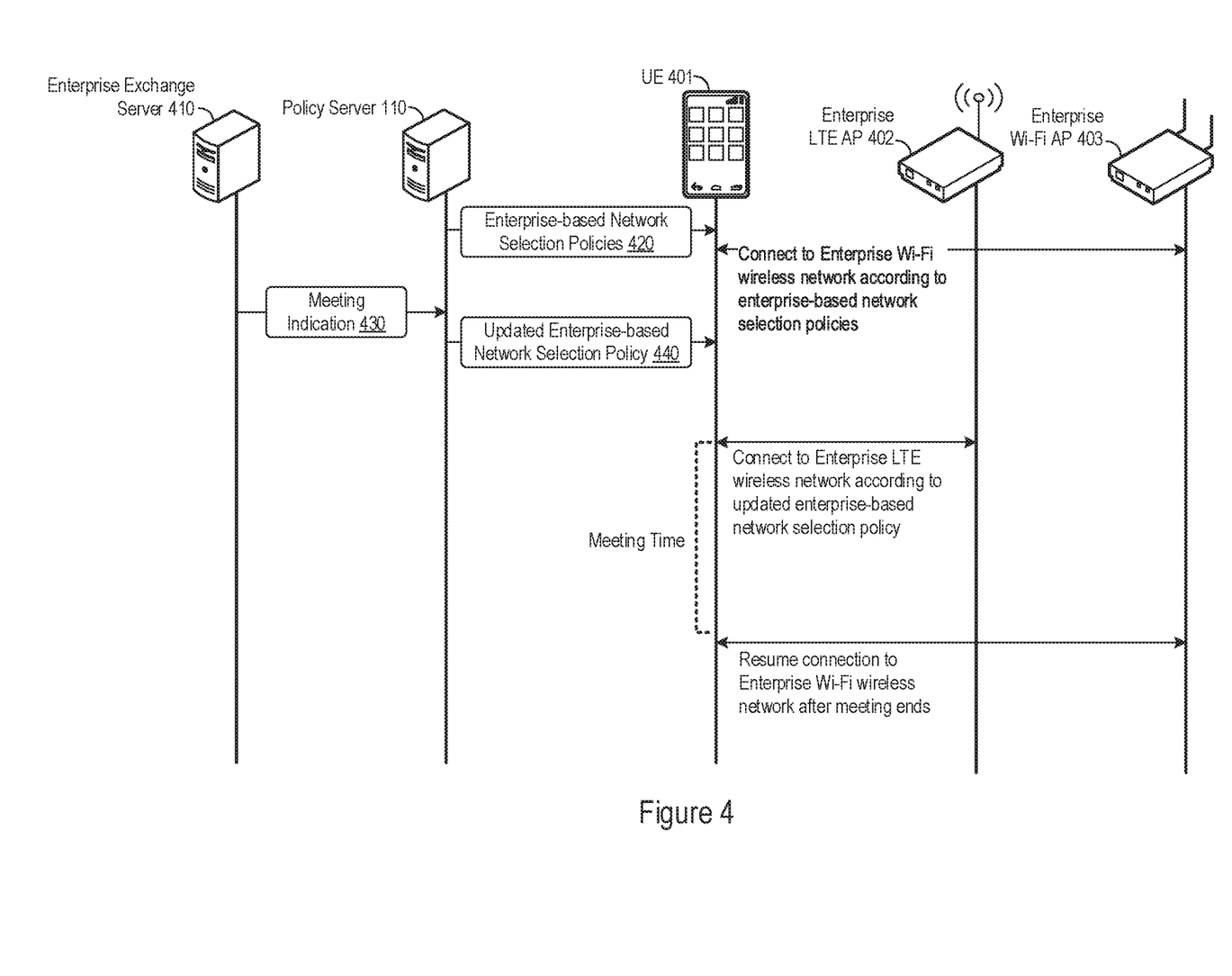
FIG. 4 shows an example of enterprise-based network selections that a user equipment may perform according to an updated enterprise-based network selection policy.

FIG. 4 shows an example of enterprise-based network selections that a user equipment may perform according to an updated enterprise-based network selection policy. FIG. 4 shows a user equipment 401, an enterprise LTE AP 402, an enterprise Wi-Fi AP 403, a policy server 110, and an enterprise exchange server 410. The enterprise exchange server 410 may support, for example, e-mail and calendaring functions within the enterprise, including the scheduling of meetings amongst various enterprise members.

The policy server 110 may send enterprise-based network selection policies 420 to the user equipment 401, which the user equipment 401 may apply to determine a particular enterprise communication network to connect to. In FIG. 4, the user equipment 401 connects to the enterprise Wi-Fi wireless network through the enterprise Wi-Fi AP 403 according to the enterprise-based network selection policies 420. The policy server 110 may update the enterprise-based network selection policies 420 according to an enterprise-specific event, such as a meeting. The updated policy may be take the form of an altered policy altered from a pre-existing policy or a new policy generated in addition to the pre-existing policies.

To illustrate through FIG. 4, the enterprise exchange server 410 may send a meeting indication 430 to the policy server 110. The meeting indication 430 may take the form of any message that indicates that a meeting within the enterprise is occurring or will occur. The meeting indication 430 may include various details regarding the meeting, including a meeting organizer, meeting attendees, the meeting time, the meeting location, etc. Through the meeting indication 430, the policy server 110 may identify any number of enterprise employee characteristics of the attendees and update the enterprise-based network selection policies 420 accordingly. In that regard, the policy server 110 may generate the updated enterprise-based network selection policy 440 and send the policy 440 to the user equipment 401. The policy server 110 may send the updated enterprise-based network selection policies 440 to the user equipment 401 when the user equipment 401 is, for example, assigned to or used by a meeting attendee or utilizes an access point that will also be utilized during the meeting (e.g., as determined by the policy server 110 based on the meeting location).

In FIG. 4, the policy server 110 sends the updated enterprise-based network selection policy 440 to the user equipment 401. The updated enterprise-based network selection policy 440 may specify that the user equipment 401 connect, instead, to the enterprise LTE wireless network during the meeting for increased network stability and quality of service as compared to the enterprise Wi-Fi wireless network. The policy server 110 may configure the updated enterprise-based network selection policy 440 to do so when, for example, a list of meeting attendees includes an attendee with an employee priority that exceeds a high priority threshold (e.g., the attendee associated with the user equipment 401 itself or another attendee associated with a different user equipment). As one illustration, the policy server 110 may generate the updated enterprise-based network selection policy 440 when a meeting attendee associated with the different user equipment has a high-level employee priority (e.g., VIP level, vice president, or the like). In this illustration, the policy server 110 may send the updated enterprise-based network selection policy 440 to the user equipment 401 because the user equipment 401 is also attending the meeting with the VIP level enterprise employee, thus providing a threshold quality of service for attendees of the meeting that include the high priority enterprise employee.

In other examples, the updated network selection policy 440 may specify that the user equipment 401 not connect to the enterprise LTE wireless network (e.g., via the enterprise LTE AP 402) during the meeting, as meeting attendees will connect to the enterprise LTE wireless network using the enterprise LTE AP 402. In this example, the policy server 110 may prevent non-meeting-attendee user equipments, such as the user equipment 401, from accessing the enterprise LTE wireless network through the enterprise LTE AP 402 so as to reserve LTE network bandwidth for the meeting attendees.

Figure 5:
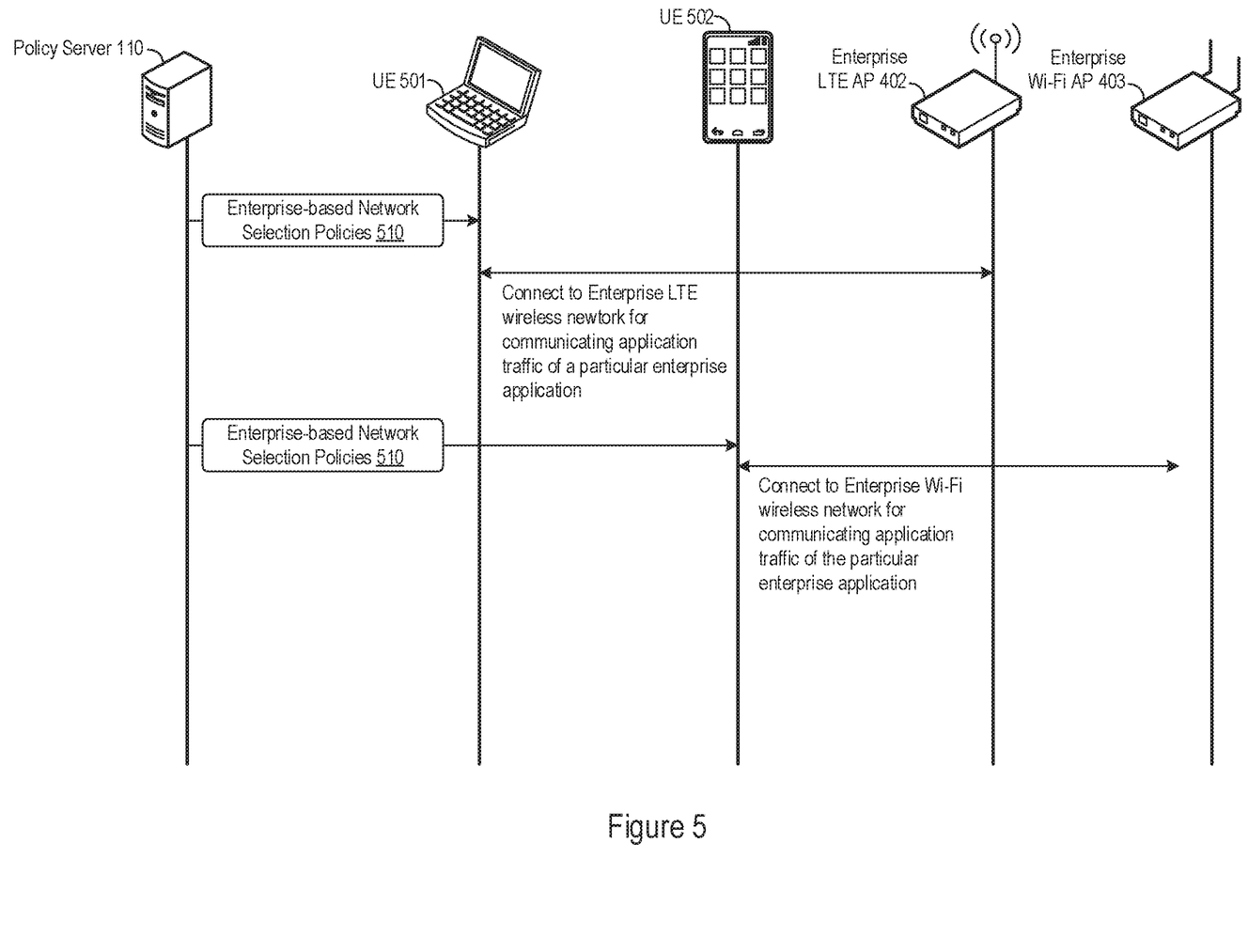
FIG. 5 shows an example of enterprise-based network selections that different user equipments may perform to communicate application traffic of a particular enterprise application.

FIG. 5 shows an example of enterprise-based network selections that different user equipments may perform to communicate application traffic of a particular enterprise application. In that regard, FIG. 5 may illustrate network access control that enterprise-based network selection policies may support for communication of similar network traffic. In FIG. 5, a policy server 110 sends a set of enterprise-based network selection policies 510 to the user equipment 501 and the user equipment 502. The user equipments 501 and 502 have associated enterprise employee characteristics that differ from one another. As such, the user equipment 501 may determine to connect to an enterprise LTE wireless network through the enterprise LTE AP 402 for communicating application traffic of a particular enterprise application. Applying the same enterprise-based network selection policies 510, the user equipment 502 may instead determine to connect to an enterprise Wi-Fi wireless network through the enterprise Wi-Fi AP 403 for communicating application traffic of the same particular enterprise application.

As noted above, the difference in network selections by the user equipments 501 and 502 may result based on differing enterprise employee characteristics associated with the user equipments 501 and 502 respectively. For instance, the user equipment 501 may be associated with a first enterprise department (e.g., client-facing) and the user equipment 502 may be associated with a second enterprise department (e.g., non-client-facing). The enterprise-based network selection policies 510 may specify that a user equipment associated with the first enterprise department connect to the enterprise LTE wireless network for particular enterprise application, but a user equipment associated with the second enterprise department connect instead to the enterprise Wi-Fi wireless network. The enterprise-based network selection policies 510 may make such a distinction on an application-specific basis, such as for enterprise videoconferencing applications used to interface with clients but not for enterprise time-recording applications that would not be used to interface with clients.

Figure 6:
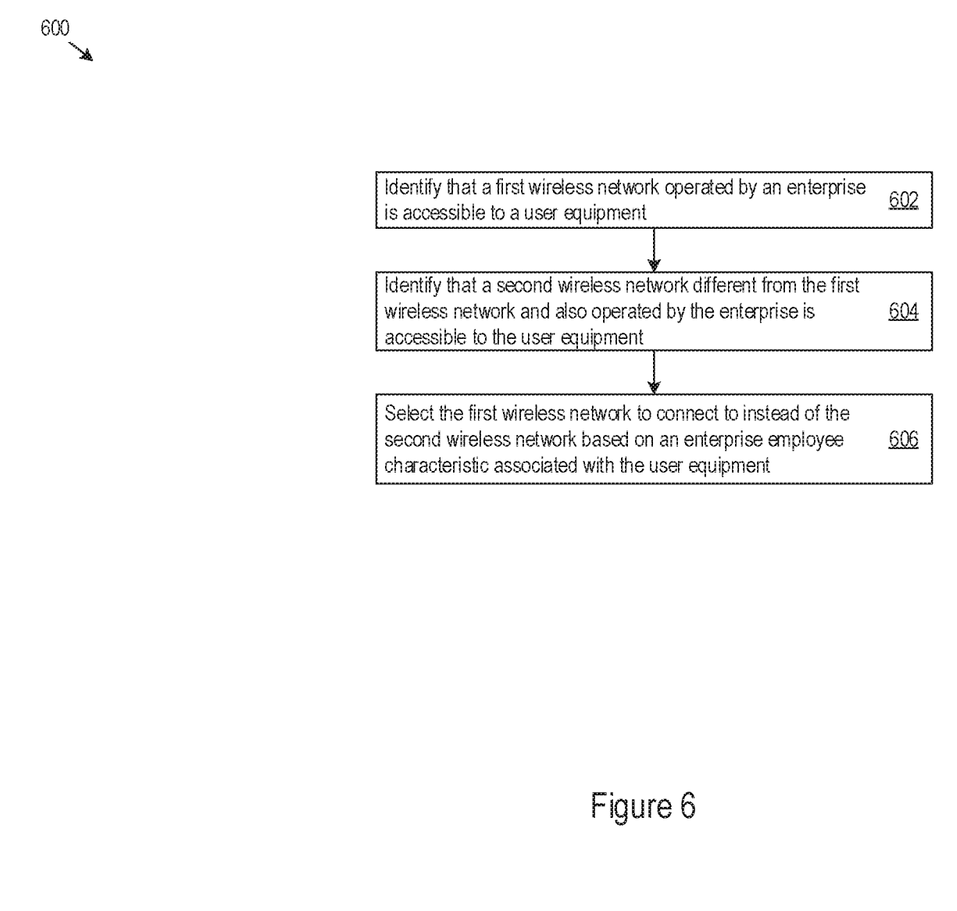
FIG. 6 shows an example of logic that a device may implement to support enterprise-based network selection.

FIG. 6 shows an example of logic 600 that a device may implement to support enterprise-based network selection. For example, a user equipment may implement the logic 600 as hardware, machine-readable instructions executable by a processing resource, or a combination of both. The user equipment may execute or perform the logic 600 as a method to perform enterprise-based network selection.

In implementing or executing the logic 600, a user equipment may identify that a first wireless network operated by an enterprise is accessible to the user equipment (602). The user equipment may further identify that a second wireless network different from the first wireless network and also operated by the enterprise is accessible to the user equipment (604) and select the first wireless network to connect to instead of the second wireless network based on an enterprise employee characteristic associated with the user equipment (606).

The enterprise employee characteristic may be any attribute of an enterprise employee, including any of the example characteristics described above. For example, the enterprise employee characteristic may include an employee priority level within the enterprise. In this example, implementing or executing the logic 600 may further include the user equipment selecting the first wireless network to connect to because the employee priority level associated with the use equipment exceeds a high priority threshold (e.g., for employees of a particular employee priority level and above).

As another example regarding an employee priority level, the user equipment may further implement or execute the logic 600 to determine that a connection cost for the first wireless network exceeds a cost threshold. In response, the user equipment may continue to connect to the first wireless network when the employee priority level of the user equipment exceeds a high priority threshold. When the employee priority level of the user equipment does not exceed the high priority threshold, the user equipment may disconnect from the first wireless network and connect to the second wireless network instead.

The user equipment may further implement or execute the logic 600 to receive an enterprise-based network selection policy from a policy server of the enterprise. The enterprise-based network selection policy may specify a connection criterion based on the enterprise employee characteristic, and the user equipment may determine to connect to the first wireless network according to the enterprise-based network selection policy received from the policy server. For instance, the enterprise employee characteristic may be an employee priority level and the enterprise-based network selection policy may specify connecting to the first wireless network when the employee priority level associated with the user equipment does not exceed a high priority threshold.

In some examples, the user equipment may further implement or execute the logic 600 to receive an updated enterprise-based network selection policy from the policy server. The updated enterprise-based network selection policy may specify that the user equipment access the second wireless network during a meeting scheduled to occur within the enterprise. As such, the user equipment may connect to the second wireless network instead of the first wireless network during the meeting, but otherwise connect to the first wireless network when the meeting is not occurring.

Figure 7:
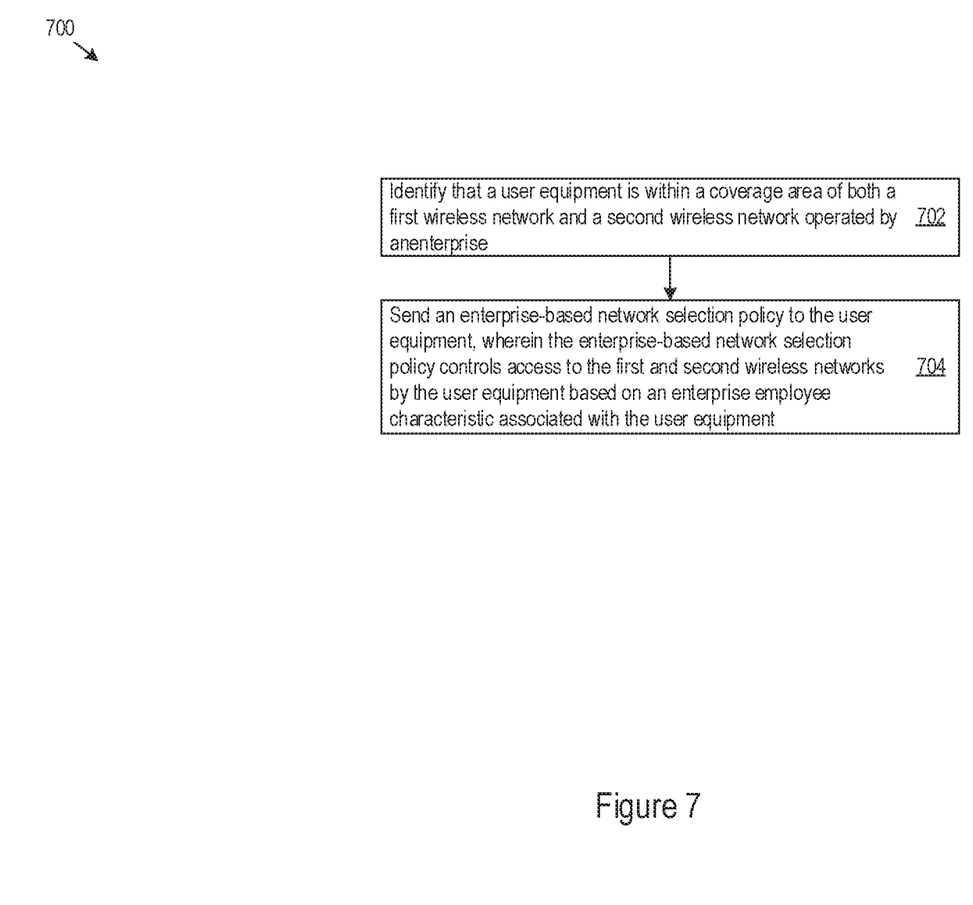
FIG. 7 shows an example of logic that a system may implement to support enterprise-based network selection.

FIG. 7 shows an example of logic 700 that a system may implement to support enterprise-based network selection. For example, a policy server may implement the logic 700 as hardware, machine-readable instructions executable by a processing resource, or a combination of both. The policy server may perform or execute the logic 700 to support enterprise-based network selection.

In implementing or executing the logic 700, the policy server may identify that a user equipment is within a coverage area of both a first wireless network and a second network operated by an enterprise (702). The policy server may then send an enterprise-based network selection policy to the user equipment (704). The enterprise-based network selection policy may control access to the first and second wireless networks by the user equipment based on any number of enterprise employee characteristics associated with the user equipment.

Figure 8:
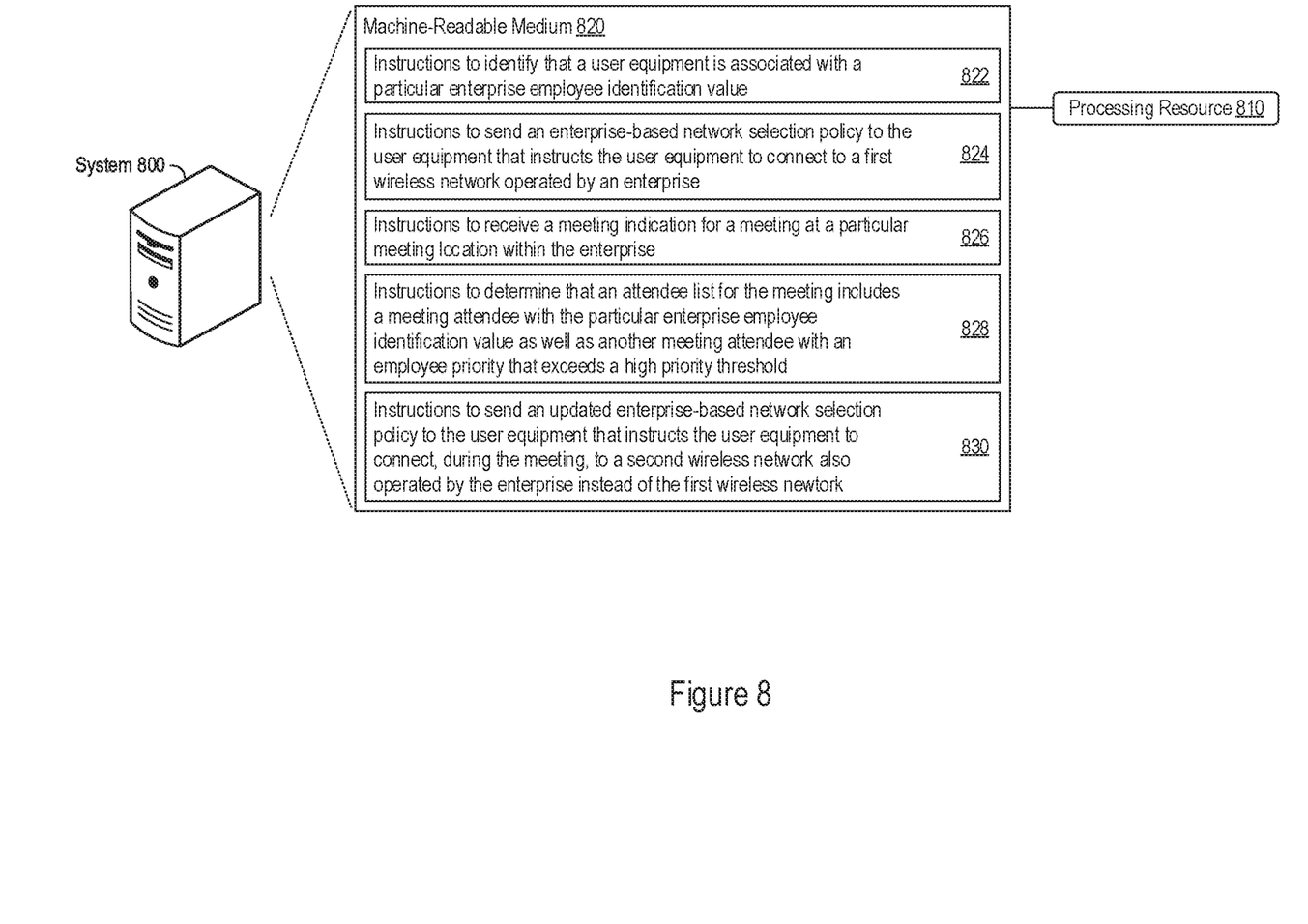
FIG. 8 shows an example of a system that supports enterprise-based network selection.

FIG. 8 shows an example of a system 800 that supports enterprise-based network selection. The system 800 may include a processing resource 810, which may take the form of a single or multiple processors. The processor(s) may include a central processing unit (CPU), microprocessor, or any hardware device suitable for executing instructions stored on a machine-readable medium. The system 800 may include a machine-readable medium 820. The machine-readable medium 820 may take the form of any non-transitory electronic, magnetic, optical, or other physical storage device that stores executable instructions, such as the instructions 822, 824, 826, 828, and 830 shown in FIG. 8. As such, the machine-readable medium 820 may be, for example, Random Access Memory (RAM) such as a dynamic RAM (DRAM), flash memory, memristor memory, spin-transfer torque memory, an Electrically-Erasable Programmable Read-Only Memory (EEPROM), a storage drive, an optical disk, and the like.

The system 800 may execute instructions stored on the machine-readable medium 820 through the processing resource 810. Executing the instructions may cause the system 800 to perform any of the enterprise-based network selection features described herein, including according to any of the features with respect to a user equipment, the policy server, or combinations thereof. For example, execution of the instructions 822, 824, 826, 828, and 830 by the processing resource 810 may cause the system 800 to identify that a user equipment is associated with a particular enterprise employee identification value; send an enterprise-based network selection policy to the user equipment that instructs the user equipment to connect to a first wireless network operated by an enterprise; receive a meeting indication for a meeting at a particular meeting location within the enterprise, wherein the meeting indication includes an attendee list; determine that the attendee list includes a meeting attendee with the particular enterprise employee identification value as well as another meeting attendee with an employee priority that exceeds a high priority threshold; and send an updated enterprise-based network selection policy to the user equipment that instructs the user equipment to connect, during the meeting, to a second wireless network also operated by the enterprise instead of the first wireless network.

As noted above, the first and second wireless networks may operate according any number of various communication protocols, standards, and technologies. For example, the first wireless network may operate according to an 802.11 communication standard (e.g., a Wi-Fi network) and the second wireless network operates according to a cellular communication network, such as LTE or any other cellular communication standard.

The systems, methods, devices, and logic described above, including the policy server 110 and the user equipment, may be implemented in many different ways in many different combinations of hardware, logic, circuitry, and executable instructions stored on a machine-readable medium. For example, policy server 110 or user equipment, may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine readable instructions stored on the medium, which when executed in an endpoint, computer system, or other device, cause the device to perform operations according to any of the description above, including according to any features of the policy server 110, a user equipment, or combinations thereof.

The processing capability of the systems, devices, and engines described herein, including the policy server 110, may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

While various examples have been described above, many more implementations are possible.

The invention claimed is:

1. A method comprising:
receiving, with a user equipment, a first enterprise-based network selection policy from a policy server of an enterprise, wherein the first enterprise-based network selection policy specifies a connection criterion based on an enterprise employee characteristic associated with the user equipment;
identifying, with the user equipment, that a first wireless network operated by the enterprise is accessible to the user equipment;
identifying, with the user equipment, that a second wireless network different from the first wireless network and also operated by the enterprise is accessible to the user equipment;
selecting, with the user equipment, the first wireless network to connect to instead of the second wireless network based on the enterprise employee characteristic;
connecting, with the user equipment to the first wireless network responsive to the selection of the first wireless network;
responsive to being connected to the first wireless network, receiving, with the user equipment, an updated enterprise-based network selection policy from the policy server; and
responsive to the updated enterprise-based network selection policy, selecting, with the user equipment, the second wireless network, disconnecting, with the user equipment, the user equipment from the first wireless network, and connecting, with the user equipment, the user equipment to the second wireless network.

2. The method of claim 1, wherein the enterprise employee characteristic comprises an employee priority level within the enterprise; and
wherein the selecting comprises selecting the first wireless network to connect to because the employee priority level associated with the user equipment exceeds a high priority threshold.

3. The method of claim 1, wherein the enterprise employee characteristic comprises an employee priority level and wherein the enterprise-based network selection policy specifies connecting to the first wireless network when the employee priority level associated with the user equipment does not exceed a high priority threshold.

4. The method of claim 1, wherein
the updated enterprise-based-network selection policy indicates access to the second wireless network during a meeting scheduled to occur within the enterprise; and
the connecting, with the user equipment, the user equipment to the second wireless network, comprises connecting, with the user equipment, to the second wireless network during the meeting.

5. A system comprising:
a first access point for a first wireless network operated by an enterprise;
a second access point for a second wireless network also operated by the enterprise, the second wireless network utilizing a different communication technology than the first wireless network; and
a policy server to:
identify that a user equipment is within a coverage area of both the first wireless network and the second wireless network operated by the enterprise;
send an enterprise-based network selection policy to the user equipment, wherein the enterprise-based network selection policy controls access to the first and second wireless networks by the user equipment based on an enterprise employee characteristic associated with the user equipment, and the enterprise-based network selection policy causes the user equipment to connect to the first access point;
responsive to at least one of an enterprise event or a change in a network condition, send an updated enterprise network selection policy to the user equipment to cause the user equipment to, responsive to the updated enterprise network selection policy, disconnect from the first access point and connect to the second access point.

6. The system of claim 5, wherein:
the change in the network condition comprises at least one of a change in a network condition of the first wireless network, or a change in a network condition of the second wireless network.

7. The system of claim 5, wherein the enterprise employee characteristic comprises an employee priority level associated with the user equipment; and
wherein the updated enterprise-based network selection policy specifies connecting to the first wireless network when the employee priority level does not exceed a high priority threshold and connecting to the second wireless network when the employee priority level exceeds the high priority threshold.

8. The system of claim 5, wherein the enterprise employee characteristic comprises an enterprise department associated with the user equipment; and
wherein the updated enterprise-based network selection policy specifies connecting to the first wireless network when the enterprise department is a first enterprise department and connecting to the second wireless network when the enterprise department is a second enterprise department.

9. The system of claim 8, wherein the first enterprise department is a client-facing department and the second enterprise department is a non-client-facing department.

10. The system of claim 5, wherein the change in the network condition comprises a change based on a backhaul condition of at least one of the first wireless network or the second wireless network.

11. The system of claim 5, wherein the enterprise employee characteristic comprises an enterprise employee identification value; and
wherein the policy server is further to:
receive a meeting indication for a meeting at a particular meeting location within the enterprise, wherein the meeting indication includes an attendee list;
determine that the attendee list includes a meeting attendee with the enterprise employee identification value associated with the user equipment as well as another meeting attendee with an employee priority that exceeds a high priority threshold; and
send the updated enterprise-based network selection policy to the user equipment that specifies the user equipment is to connect, during the meeting, to the second wireless network instead of the first wireless network.

12. A non-transitory machine-readable medium comprising instructions executable by a processing resource to:
identify that a user equipment is associated with a particular enterprise employee identification value;
user equipment to connect to a first wireless network operated by an enterprise;
receive a meeting indication for a meeting at a particular meeting location within the enterprise, wherein the meeting indication includes an attendee list;
determine that the attendee list includes a meeting attendee with the particular enterprise employee identification value as well as another meeting attendee with an employee priority that exceeds a high priority threshold; and
send an updated enterprise-based network selection policy to the user equipment that instructs the user equipment to connect, during the meeting, to a second wireless network also operated by the enterprise instead of the first wireless network.

13. The non-transitory machine-readable medium of claim 12, wherein the first wireless network operates according to an 802.11 communication standard and the second wireless network operates according to a cellular communication standard.

14. A method comprising:
identifying, with a user equipment, that a first wireless network operated by an enterprise is accessible to the user equipment;
identifying, with the user equipment, that a second wireless network different from the first wireless network and also operated by the enterprise is accessible to the user equipment;
selecting, with the user equipment, the first wireless network to connect to instead of the second wireless network based on an enterprise employee characteristic associated with the user equipment, wherein the enterprise employee characteristic comprises an employee priority level within the enterprise; and
determining, with the user equipment, that a connection cost for the first wireless network exceeds a cost threshold, and in response:
when the employee priority level of the user equipment exceeds a high priority threshold:
continuing, with the user equipment, to connect to the first wireless network; and
when the employee priority level of the user equipment does not exceed the high priority threshold:
disconnecting, with the user equipment, from the first wireless network and connecting to the second wireless network instead.

* * * * *